US009204474B2

(12) United States Patent
Kovvali et al.

(10) Patent No.: US 9,204,474 B2
(45) Date of Patent: Dec. 1, 2015

(54) DESTINATION LEARNING AND MOBILITY DETECTION IN TRANSIT NETWORK DEVICE IN LTE AND UMTS RADIO ACCESS NETWORKS

(71) Applicant: Movik Networks, Westford, MA (US)

(72) Inventors: Surya Kumar Kovvali, Westborough, MA (US); Ravi Valmikam, Cupertino, CA (US)

(73) Assignee: Movik Networks, Westford, MA (US)

( * ) Notice: Subject to any disclaimer, the term of this patent is extended or adjusted under 35 U.S.C. 154(b) by 61 days.

(21) Appl. No.: 14/033,578

(22) Filed: Sep. 23, 2013

(65) Prior Publication Data

US 2014/0016509 A1 Jan. 16, 2014

Related U.S. Application Data (63) Continuation of application No. 13/243,418, filed on Sep. 23, 2011, now Pat. No. 8,565,076.

(60) Provisional application No. 61/386,034, filed on Sep. 24, 2010.

(51) Int. Cl.
*G01R 31/08* (2006.01)
*H04W 76/02* (2009.01)
(Continued)

(52) U.S. Cl.
CPC ............ *H04W 76/021* (2013.01); *H04W 8/082* (2013.01); *H04W 8/26* (2013.01); *H04W 88/182* (2013.01)

(58) Field of Classification Search
CPC ... H04W 84/045; H04W 36/14; H04W 12/08; H04W 36/0055; H04W 8/16; H04L 12/5865; H04L 2012/5607
See application file for complete search history.

(56) References Cited

U.S. PATENT DOCUMENTS 6,105,064 A 8/2000 Davis et al.
6,694,349 B1 2/2004 Zou
(Continued)

FOREIGN PATENT DOCUMENTS

EP 2197187 A1 6/2010
EP 2512101 A1 10/2012
(Continued)

OTHER PUBLICATIONS

International Search Report/Written Opinion dated Oct. 6, 2009 in co-pending PCT application No. PCT/US2009/052871.
(Continued)

*Primary Examiner* — Fan Ng
(74) *Attorney, Agent, or Firm* — Nields, Lemack & Frame, LLC (57) ABSTRACT

A method of learning and identifying two unidirectional GTP-U tunnels corresponding to a user equipment (UE) in a device placed in a LTE network, where the device acts as a transparent proxy intercepting user plane and control plane protocols on the S1 interface, is disclosed. Methods of pairing the two unidirectional tunnels that belong to same UE, when there is no control plane information or when there is Control Plane information, but the NAS portions of the S1 Control that contain bearer IP addresses are encrypted, are disclosed. Control plane and user plane methods for associating GTP-U tunnels and the corresponding bearer plane IP addresses are identified. Additionally, methods for detecting mobility of a UE, as it moves from the coverage area of one E-NodeB to another, are disclosed. Methods for constructing an eNodeB topology map are also disclosed.

11 Claims, 9 Drawing Sheets

(51) Int. Cl.
H04W 8/08 (2009.01)
H04W 8/26 (2009.01)
H04W 88/18 (2009.01)

(56) References Cited

U.S. PATENT DOCUMENTS

| | | | |
|---|---|---|---|
| 6,907,501 | B2 | 6/2005 | Tariq et al. |
| 6,996,085 | B2 | 2/2006 | Travostino et al. |
| 7,047,312 | B1 | 5/2006 | Aweya et al. |
| 7,318,100 | B2 | 1/2008 | Demmer et al. |
| 7,568,071 | B2 | 7/2009 | Kobayashi et al. |
| 7,583,594 | B2 | 9/2009 | Zakrzewski |
| 7,739,383 | B1 | 6/2010 | Short et al. |
| 7,797,369 | B2 | 9/2010 | Glickman |
| 7,965,634 | B2 | 6/2011 | Aoyanagi |
| 7,991,905 | B1 | 8/2011 | Roussos et al. |
| 8,111,630 | B2 | 2/2012 | Kovvali et al. |
| 8,161,158 | B2 | 4/2012 | Curcio et al. |
| 8,190,674 | B2 | 5/2012 | Narayanan et al. |
| 8,208,430 | B2 | 6/2012 | Valmikam et al. |
| 8,451,800 | B2 | 5/2013 | Kovvali et al. |
| 8,565,076 | B2* | 10/2013 | Kovvali et al. ............... 370/229 |
| 8,576,744 | B2 | 11/2013 | Kovvali et al. |
| 8,717,890 | B2 | 5/2014 | Kovvali et al. |
| 8,799,480 | B2 | 8/2014 | Kovvali et al. |
| 9,001,840 | B2 | 4/2015 | Kovvali et al. |
| 9,043,467 | B2 | 5/2015 | Kovvali et al. |
| 2003/0003919 | A1 | 1/2003 | Beming et al. |
| 2003/0058874 | A1 | 3/2003 | Sahaya et al. |
| 2003/0095526 | A1 | 5/2003 | Froehlich et al. |
| 2003/0120805 | A1 | 6/2003 | Couts et al. |
| 2003/0179720 | A1 | 9/2003 | Cuny |
| 2003/0195977 | A1 | 10/2003 | Liu et al. |
| 2004/0064577 | A1 | 4/2004 | Dahlin et al. |
| 2004/0068571 | A1 | 4/2004 | Ahmavaara |
| 2004/0098748 | A1 | 5/2004 | Bo et al. |
| 2004/0185876 | A1 | 9/2004 | Groenendaal et al. |
| 2004/0223505 | A1 | 11/2004 | Kim et al. |
| 2004/0240390 | A1 | 12/2004 | Seckin |
| 2004/0264368 | A1 | 12/2004 | Heiskari et al. |
| 2005/0033857 | A1 | 2/2005 | Imiya |
| 2005/0097085 | A1 | 5/2005 | Shen et al. |
| 2005/0117583 | A1 | 6/2005 | Uchida et al. |
| 2005/0135428 | A1 | 6/2005 | Hellgren |
| 2005/0136973 | A1 | 6/2005 | Llamas et al. |
| 2005/0157646 | A1 | 7/2005 | Addagatla et al. |
| 2006/0018294 | A1 | 1/2006 | Kynaslahti et al. |
| 2006/0117139 | A1 | 6/2006 | Kobayashi et al. |
| 2006/0159121 | A1 | 7/2006 | Sakata et al. |
| 2006/0167975 | A1 | 7/2006 | Chan et al. |
| 2006/0193289 | A1 | 8/2006 | Ronneke et al. |
| 2006/0274688 | A1 | 12/2006 | Maxwell et al. |
| 2006/0277271 | A1 | 12/2006 | Morse et al. |
| 2007/0025301 | A1 | 2/2007 | Petersson et al. |
| 2007/0110098 | A1* | 5/2007 | Hart et al. ............... 370/464 |
| 2007/0113013 | A1 | 5/2007 | Knoth |
| 2007/0143218 | A1 | 6/2007 | Vasa |
| 2007/0156845 | A1 | 7/2007 | Devanneaux et al. |
| 2007/0160181 | A1 | 7/2007 | Barbaresi et al. |
| 2007/0174428 | A1 | 7/2007 | Lev Ran et al. |
| 2007/0213058 | A1 | 9/2007 | Shaheen |
| 2007/0223379 | A1 | 9/2007 | Sivakumar et al. |
| 2007/0230342 | A1 | 10/2007 | Skog |
| 2007/0254671 | A1 | 11/2007 | Liu |
| 2007/0275726 | A1 | 11/2007 | Lee et al. |
| 2008/0026789 | A1 | 1/2008 | Llamas et al. |
| 2008/0031194 | A1 | 2/2008 | Yaqub |
| 2008/0050119 | A1* | 2/2008 | Effenberger ............... 398/68 |
| 2008/0052366 | A1 | 2/2008 | Olsen et al. |
| 2008/0056295 | A1* | 3/2008 | Loda et al. ............... 370/437 |
| 2008/0081637 | A1 | 4/2008 | Ishii et al. |
| 2008/0082753 | A1 | 4/2008 | Licht et al. |
| 2008/0162713 | A1 | 7/2008 | Bowra et al. |
| 2008/0186912 | A1 | 8/2008 | Huomo |
| 2008/0191816 | A1 | 8/2008 | Balachandran et al. |
| 2008/0195745 | A1 | 8/2008 | Bowra et al. |
| 2008/0244095 | A1 | 10/2008 | Vos et al. |
| 2008/0273533 | A1 | 11/2008 | Deshpande |
| 2008/0320151 | A1 | 12/2008 | McCanne et al. |
| 2009/0019178 | A1 | 1/2009 | Melnyk et al. |
| 2009/0019229 | A1 | 1/2009 | Morrow et al. |
| 2009/0024835 | A1 | 1/2009 | Fertig et al. |
| 2009/0029644 | A1 | 1/2009 | Sue et al. |
| 2009/0043906 | A1 | 2/2009 | Hurst et al. |
| 2009/0067367 | A1 | 3/2009 | Buracchini et al. |
| 2009/0135749 | A1 | 5/2009 | Yang |
| 2009/0156213 | A1 | 6/2009 | Spinelli et al. |
| 2009/0196233 | A1 | 8/2009 | Zhu et al. |
| 2009/0210904 | A1 | 8/2009 | Baron et al. |
| 2009/0213850 | A1* | 8/2009 | Viger et al. ............... 370/389 |
| 2009/0254330 | A1 | 10/2009 | Goria |
| 2009/0270098 | A1 | 10/2009 | Gallagher et al. |
| 2009/0274161 | A1 | 11/2009 | Liu |
| 2009/0274224 | A1 | 11/2009 | Harris |
| 2009/0287842 | A1 | 11/2009 | Plamondon |
| 2009/0291696 | A1 | 11/2009 | Cortes et al. |
| 2010/0020685 | A1 | 1/2010 | Short et al. |
| 2010/0023579 | A1 | 1/2010 | Chapweske et al. |
| 2010/0034089 | A1 | 2/2010 | Kovvali et al. |
| 2010/0041402 | A1 | 2/2010 | Gallagher et al. |
| 2010/0054204 | A1 | 3/2010 | Dolganow et al. |
| 2010/0057883 | A1 | 3/2010 | Cao et al. |
| 2010/0057887 | A1 | 3/2010 | Wang et al. |
| 2010/0067378 | A1 | 3/2010 | Cohen et al. |
| 2010/0085962 | A1 | 4/2010 | Issaeva et al. |
| 2010/0088369 | A1 | 4/2010 | Sebastian et al. |
| 2010/0091736 | A1 | 4/2010 | Kim et al. |
| 2010/0106770 | A1 | 4/2010 | Taylor et al. |
| 2010/0153529 | A1 | 6/2010 | Moser |
| 2010/0158026 | A1 | 6/2010 | Valmikam et al. |
| 2010/0161756 | A1 | 6/2010 | Lewis et al. |
| 2010/0184421 | A1 | 7/2010 | Lindqvist et al. |
| 2010/0195602 | A1 | 8/2010 | Kovvali et al. |
| 2010/0205375 | A1 | 8/2010 | Challener et al. |
| 2010/0215015 | A1 | 8/2010 | Miao et al. |
| 2010/0272021 | A1 | 10/2010 | Kopplin et al. |
| 2010/0291943 | A1 | 11/2010 | Mihaly et al. |
| 2010/0302943 | A1* | 12/2010 | Rawlins et al. ............... 370/231 |
| 2010/0325334 | A1 | 12/2010 | Tsai et al. |
| 2011/0110333 | A1 | 5/2011 | Chen |
| 2011/0136488 | A1 | 6/2011 | Kuvvali et al. |
| 2011/0167170 | A1 | 7/2011 | Kovvali et al. |
| 2011/0201305 | A1 | 8/2011 | Buer et al. |
| 2011/0213800 | A1 | 9/2011 | Saros et al. |
| 2011/0243553 | A1 | 10/2011 | Russell |
| 2012/0076120 | A1* | 3/2012 | Kovvali et al. ............... 370/338 |
| 2012/0077500 | A1 | 3/2012 | Shaheen |
| 2012/0099533 | A1 | 4/2012 | Kovvali et al. |
| 2012/0120788 | A1 | 5/2012 | Hu |
| 2012/0184258 | A1 | 7/2012 | Kovvali et al. |
| 2012/0191862 | A1 | 7/2012 | Kovvali et al. |
| 2012/0220328 | A1 | 8/2012 | Yu et al. |
| 2013/0235845 | A1 | 9/2013 | Kovvali et al. |
| 2013/0246638 | A1 | 9/2013 | Kovvali et al. |
| 2013/0336320 | A1* | 12/2013 | Rangaraman ............... 370/392 |
| 2014/0016509 | A1* | 1/2014 | Kovvali et al. ............... 370/254 |
| 2014/0056137 | A1 | 2/2014 | Kovvali et al. |

FOREIGN PATENT DOCUMENTS

| | | |
|---|---|---|
| WO | 02/104055 A1 | 12/2002 |
| WO | 2008/076073 A1 | 6/2008 |
| WO | 2010/060438 A1 | 6/2010 |
| WO | 2012/012334 A2 | 1/2012 |

OTHER PUBLICATIONS

International Preliminary Report on Patentability mailed Feb. 23, 2012 in co-pending PCT application No. PCT/US09/52871.
International Search Report/Written Opinion dated Mar. 1, 2010 in co-pending PCT application No. PCT/US2009/069260.
International Search Report/Written Opinion dated Mar. 12, 2010 in co-pending PCT application No. PCT/US2010/22542.

(56) References Cited

OTHER PUBLICATIONS

International Search Report/Written Opinion dated May 13, 2011 in co-pending PCT application No. PCT/US2011/28477.
International Search Report/Written Opinion mailed Feb. 29, 2012 in co-pending PCT application No. PCT/US2011/044156.
International Search Report and Written Opinion mailed Feb. 29, 2012 in co-pending PCT application No. PCT/US2011/044361.
International Search Report/Written Opinion mailed Apr. 25, 2012 in corresponding PCT application No. PCT/US2011/053050, 8 pages.
RFC 1644-T/TCP—TCP Extensions for Translations Functional Specification, Jul. 1994—http://www.faqs.org/rfcs/rfc1644.html, 38 pages, R. Braden, et al.
RFC 3135—Performance Enhancing Proxies Intended to Mitigate Link-Related Degradations, Jun. 2001—http://www.faqs.org.rfcs/rfc3135.html, 48 pages, J. Border et al.
RFC 2045—Multipurpose Internet Mail Extensions (MIME) Part One: Format of Internet Message Bodies; Nov. 1996—http://www.faqs.org/rfcs/rfc2045.html, 34 pages, N. Freed, et al.
ETSI TS 136 413 V 9.8.0, Technical Specification, Jan. 2012, LTE; "Evolved Universal Terrestrial Radio Access Network (E-UTRAN); S1 Application Protocol (S1AP)" (3GPP TS 36.413 version 9.8.0 Release 9), 248 pages.
3GPP TR 23.829 V1.3.0, Technical Report, Sep. 2010, "3rd Generation Partnership Project; Technical Specification Group Services and System Aspects; Local IP Access and Selected IP Traffic Offload; (Release 10)", 44 pages.
Http header enrichment, http://news.thomasnet.com/fullstory/Software-optimizes-high-speed-wireless-data-networks-485934, "Software optimizes high-speed wireless data networks", Jun. 26, 2006, 10 pages, Thomasnet News.
Proceedings of the USENIX Symposium on Internet Technologies and Systems, Dec. 1997, "Cost-Aware WWW Proxy Caching Algorithms", 15 pages, Cao, et al.
The Book of Webmin . . . Or: How I Learned to Stop Worrying and Love UNIX, 2003, Chapter 12—Squid, 23 pages., Cooper.
Proceedings of the 3rd International Workshop on Modeling Analysis and Simulation of Wireless and Mobil Systems (MSWIM '00), ACM, 2000, pp. 77-84, "Prefetching Policies for Energy Saving and Latency Reduction in a Wireless Broadcast Data Delivery System", Grassi.
Eighth ACIS International Conference on Software Engineering, Artificial Intelligence, Networking, and Parallel/Distributed Computing, IEEE, 2007, "An Integrated Prefetching and Caching Scheme for Mobile Web Caching System", p. 522-527, Jin, et al.
Proceedings of the 22nd International Conference on Distributed Computing Systems (ICDCS '02), IEEE, 2002, "Power-Aware Prefetch in Mobile Environments", 8 pages, Yin, et al.
HP Labs Report No. HPL-1999-69, May 1999, pp. 1-17, "Enhancement and Validation of Squid's Cache Replacement Policy", Dilley, et al. 18 pages.
Office Action mailed Oct. 23, 2012 in co-pending U.S. Appl. No. 12/696,378.
Final Rejection mailed Nov. 26, 2013 in co-pending U.S. Appl. No. 12/696,378.
Office Action mailed Apr. 30, 2013 in co-pending U.S. Appl. No. 13/048,378.
Final Rejection mailed Oct. 29, 2013 in co-pending U.S. Appl. No. 13/048,378.
Office Action mailed Apr. 12, 2013 in co-pending U.S. Appl. No. 13/185,066.
Final Rejection mailed Nov. 18, 2013 in co-pending U.S. Appl. No. 13/185,066.
Office Action mailed Aug. 26, 2014 in co-pending U.S. Appl. No. 14/071,009.
Notice of Allowance mailed Jan. 23, 2015 in co-pending U.S. Appl. No. 14/071,009.
Office Action mailed Oct. 31, 2014 in co-pending U.S. Appl. No. 13/048,378.
Office Action—Restriction—mailed Dec. 26, 2013 in co-pending U.S. Appl. No. 13/183,777.
Office Action mailed May 23, 2014 in co-pending U.S. Appl. No. 13/183,777.
Final Rejection mailed Jan. 20, 2015 in co-pending U.S. Appl. No. 13/183,777.
Office Action mailed Jul. 1, 2015 in co-pending U.S. Appl. No. 13/889,688.
ICPWC '94, IEEE 1994, pp. 100-107, "A Connection Management Scheme for a Mobile Radio LAN", Biswas, el al.
Proc. International Conference on Software, Telecommunications and Computer Networks, SoftCOM 2008, IEEE 2008, "A Web Caching and Prefetching Simulator", 10 pages, Marquez, et al.

* cited by examiner

DESTINATION LEARNING AND MOBILITY DETECTION IN TRANSIT NETWORK DEVICE IN LTE AND UMTS RADIO ACCESS NETWORKS

This application is a Continuation of U.S. patent application Ser. No. 13/243,418 filed Sep. 23, 2011, which claims priority of U.S. Provisional Patent Application Ser. No. 61/386,034, filed Sep. 24, 2010, the disclosures of which are incorporated herein by reference in its entirety.

BACKGROUND

Content-Aware Caching and Proxy operations by a transit network device, when placed in Radio Access Networks (RAN) in UMTS and LTE networks, are described in copending U.S. Patent Publication No. 2010-0034089, the disclosure of which is incorporated by reference.

3GPP Release 10 Specifications define the Selective IP Traffic Offload (SIPTO) function in a transit network device (Traffic Offload Device) that intercepts the IuPS interface in the UMTS network. It offloads portions of SGSN/GGSN (Serving GPRS Support Node/Gateway GPRS Support Node) or SGW/PGW (Serving Gateway/PDN Gateway) traffic to an offload interface attached to the Internet or to the operator's data network. These specifications also define alternative solutions for Traffic Offload in the UMTS and LTE networks. The offload policies in these specifications use Access Point Name (APN) information or implement offload control specified by the SGSN/MME in the control plane.

It should be noted that the TOF (Traffic Offload Function) device defined in the 3GPP specification is a gateway device which forwards packets from one interface to either the offload interface or to the default SGSN/GGSN or SGW/PGW. However, it is not a content caching and content aware proxy device.

The SIPTO feature in these specifications does not specify caching content nor do these specifications define SIPTO devices capable of originating traffic. For example, these specifications do not define terminating a TCP session and delivering stored content from cache. Delivering content from cache, for example responding to a http request from Radio Network Controller (RNC) or eNodeB, requires establishing an association between two unidirectional GTP-U tunnels and mapping their bearer-plane User Equipment (UE) IP address. The caching device needs to encapsulate http responses for locally cached objects with the GTP-U tunnel ID of the RNC or eNodeB for the corresponding UE from these learned associations. Similarly, while performing Selective IP Traffic Offload function, the transit network device terminates the per UE GTP-U tunnel of traffic received from E-NodeB/RNC and forwards traffic based on bearer plane IP addresses, and encapsulates the traffic received from the offload interface with the GTP-U tunnel corresponding to the specific UE and bearer IP address while forwarding to the eNodeB/RNC.

The 3GPP specifications define learning the GTP-U tunnel and Bearer IP Addresses from the S11 interface in the LTE architecture. Also the S1-AP specification contains protocol elements that contain bearer IP addresses and the user plane GTP-Tunnel-IDs; however bearer IP addresses are contained within the NAS portion of the PDUs which may be encrypted and/or in certain deployments the logical S1AP may not available at specific deployment locations.

However, these specifications do not provide guidance regarding associating tunnels when the TOF or SIPTO device acts as a transparent proxy device. Thus, to properly implant local content caching, a method is needed to identify and associate pairs of GTP-U tunnels for each UE. Thus the current invention identifies methods of establishing association between the two unidirectional flows and the corresponding bearer IP addresses.

SUMMARY

The present disclosure describes a method of learning and identifying two unidirectional tunnels (such as GTP-U tunnels in UMTS and LTE Networks) corresponding to a user equipment (UE) using a device placed in a Radio Access Network, where the device acts as a transparent proxy intercepting user plane and control plane protocols on the S1 interface. The S1 interface is the logical interface between eNodeB and core network. This interface includes the control plane (S1-C) between the eNodeB and the MME (Mobility Management Entity), and the user plane (S1-U) between the eNodeB and the SGW (Serving Gateway).

The GTP-U tunnels on the S1 interface in the LTE architecture and the IUPS interface in UMTS architecture are per UE and are unidirectional. Thus, traffic received from the eNodeB contains
- the S/PGW (Serving Gateway/PDN Gateway) Tunnel ID,
- User Source/Destination IP Addresses, and
- Source/Destination Transport Addresses.

Traffic received from the S/PGW contains:
- the eNodeB Tunnel ID,
- User Source/Destination IP Addresses, and
- Source/Destination Transport Addresses.

The two unidirectional tunnels belonging to a specific UE have to be associated with each other for delivering any locally cached content or for delivering traffic received from an offload interface in a transit network device placed in RAN. The present disclosure identifies methods of pairing the two unidirectional tunnels that belong to same UE, when there is no control plane information or when there is control plane information, but the NAS portions of the S1 Control plane that contain the bearer IP addresses are encrypted.

In the latter case, the bearer IP addresses that belong to GTP-U tunnels cannot be identified by a transit device from the control plane since they are encrypted. Thus, the present disclosure defines control plane and user plane methods for associating GTP-U tunnels and the corresponding bearer plane IP addresses. Additionally, the present disclosure defines methods for detecting the mobility of a UE, as the UE moves from the coverage area of one eNodeB to another as the transit device is intercepting S1 interfaces of a plurality of eNodeBs in an LTE network, a plurality of RNCs in an UMTS network or a plurality of PCFs in a CDMA Network.

Furthermore, the present disclosure identifies methods to construct a topology map of eNodeBs, based on the information passed to the core network.

DETAILED DESCRIPTION

The present disclosure defines the process of learning the association between two unidirectional tunnels and the corresponding bearer plane IP Addresses from the S1 User Plane or from a combination of S1 User and Control Planes when NAS Portions of the S1 Control plane protocols that contain UE IP Address are encrypted.

Figure 1:
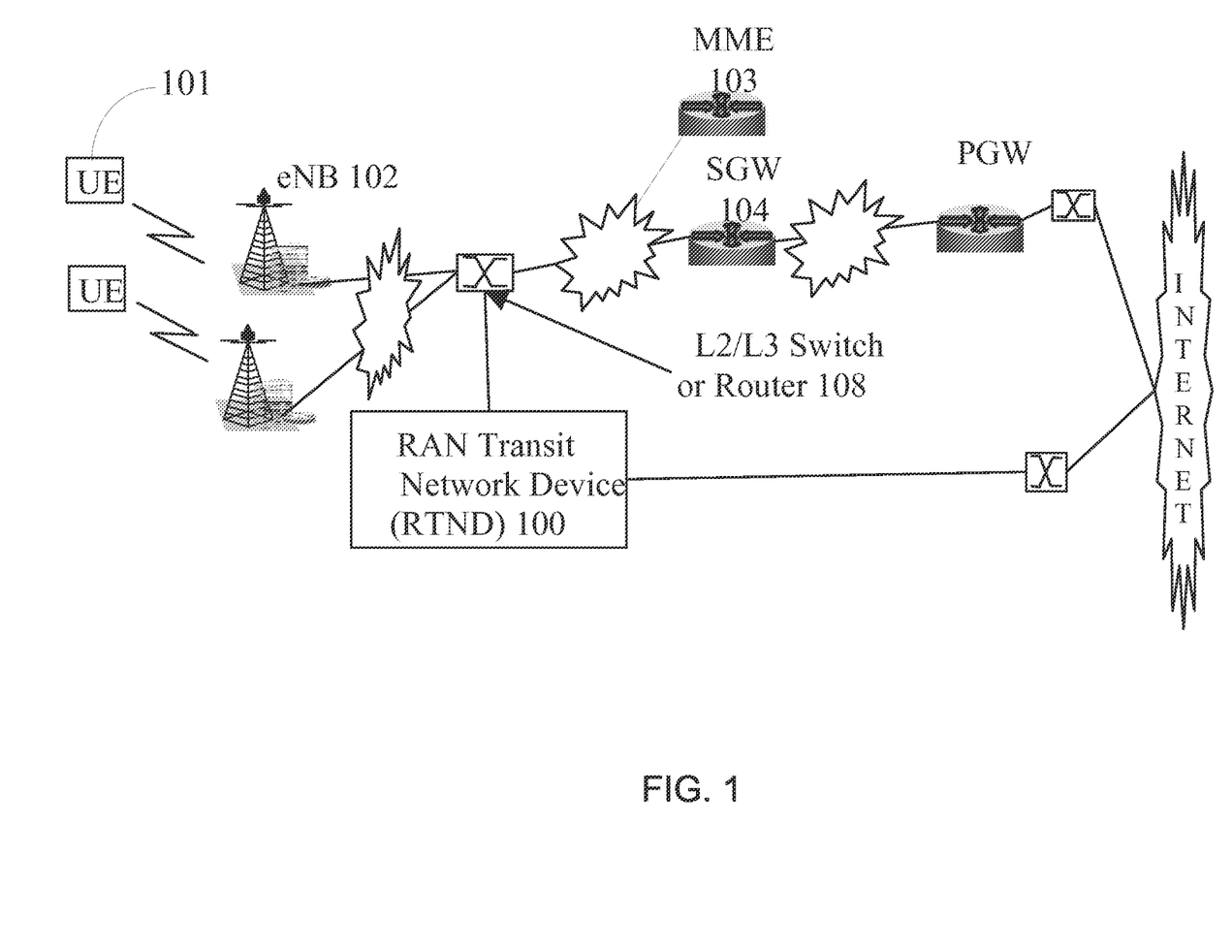
FIG. 1 shows the location of a RAN transit network device in accordance with one embodiment of the present disclosure.

Another aspect of the present invention is the ability to detect the mobility of a mobile device (from IUPS User Plane in UMTS or S1-U in LTE networks) in a RTND/Traffic offload device 100 when the device is deployed as shown in FIG. 1. This figure shows eNodeB 102 connected to the Core Network elements, such as the MME (Mobile Management Entity) 103 and SGW (Serving Gateway) 104 through a Layer2/Layer3 switch 108. The logical interface S1-C carries the control plane traffic between the eNodeB 102 and the MME 103, and S1-U carries the user plane traffic between the eNodeB 102 and the SGW 104. In this scenario, RTND 100 has visibility to both of the user plane tunnel's S1 interfaces and detects mobility of a UE from one eNodeB to another. In this embodiment, the RTND 100 is able to serve as a content cache if desired.

Figure 2:
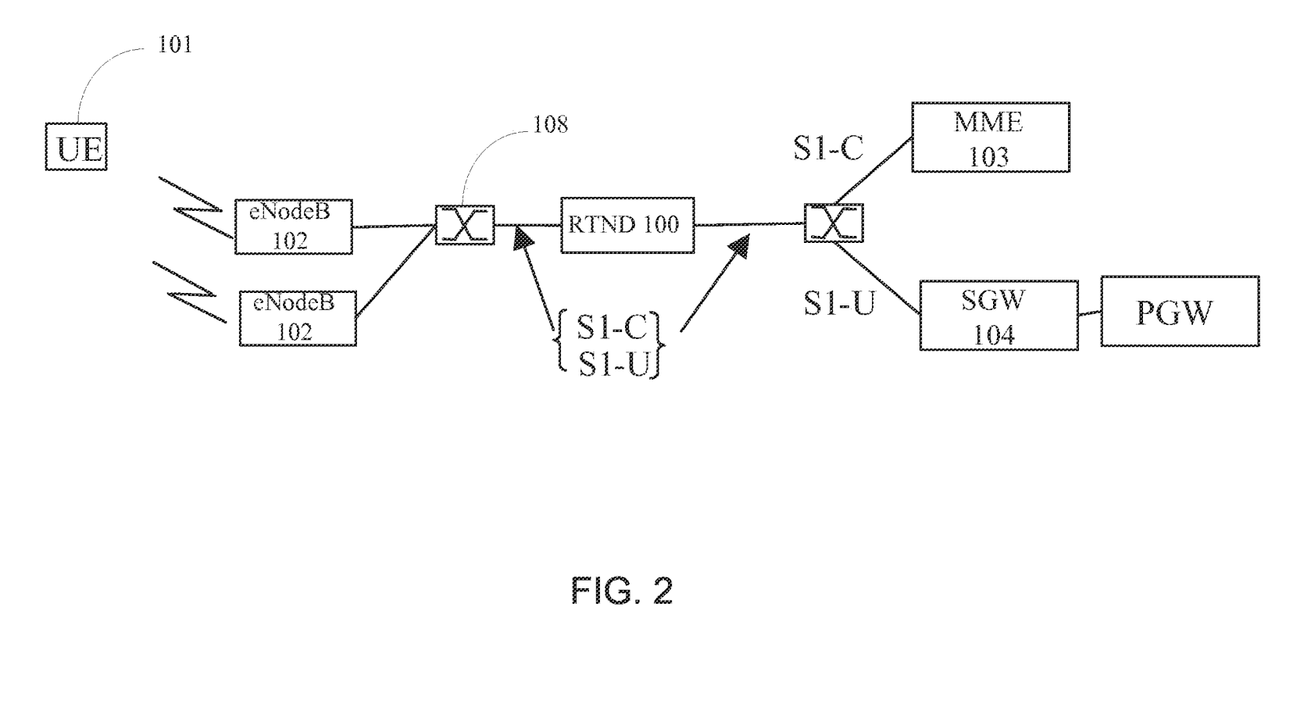
FIG. 2 shows logical interfaces that the device used in the present disclosure intercepts when used in a LTE RAN.

FIG. 2 shows the logical interfaces that the RTND 100 intercepts, when used in an LTE RAN, to perform the methods of the present disclosure. This Figure shows the RTND 100 that incorporates the current inventive methods may be logically or physically placed between the eNodeB 102 and the core network elements, such as MME 103 and SGW 104. In other words, the RTND 100 may be a separate component placed between elements in the RAN, or may be incorporated or integrated into one of these existing network elements. Therefore, the RTND 100 can intercept S1-U protocols, and optionally the S1-C control plane protocols.

Figure 10:
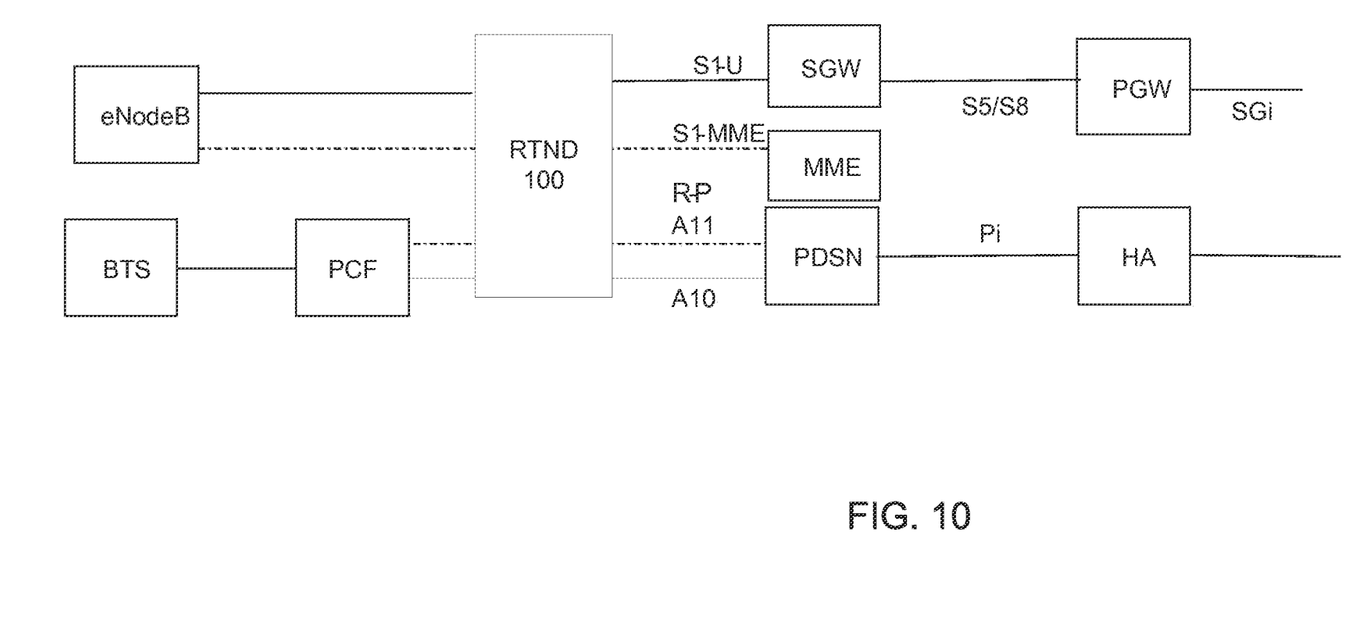
FIG. 10 shows the location of a RAN transit network device in accordance with another embodiment of the present disclosure.

While the descriptions use the LTE network as examples, the present invention is equally applicable to other mobile networks such as, UMTS, EVDO/CDMA, WIMAX etc., where user IP traffic is carried within encapsulated unidirectional tunnels (GTP-U or GRE) tunnels for specific user's flows and embedding them within transport layer addresses (i.e., with Source and Destination IP addresses of the network devices). For example, the methods are equally applicable for a device placed in RAN in the UMTS network, for example, on the IUPS interface between RNC and Core Network (SGSN/GGSN), or in CDMA network intercepting A10/A11 interfaces. FIG. 10 shows the placement of the RTND 100 in a CDMA network.

3GPP standards (36.413) define the process of establishing two unidirectional GTP-U tunnels and the associated User IP address for carrying user's data traffic using control plane protocols (such as S1AP in LTE).

Figure 3:
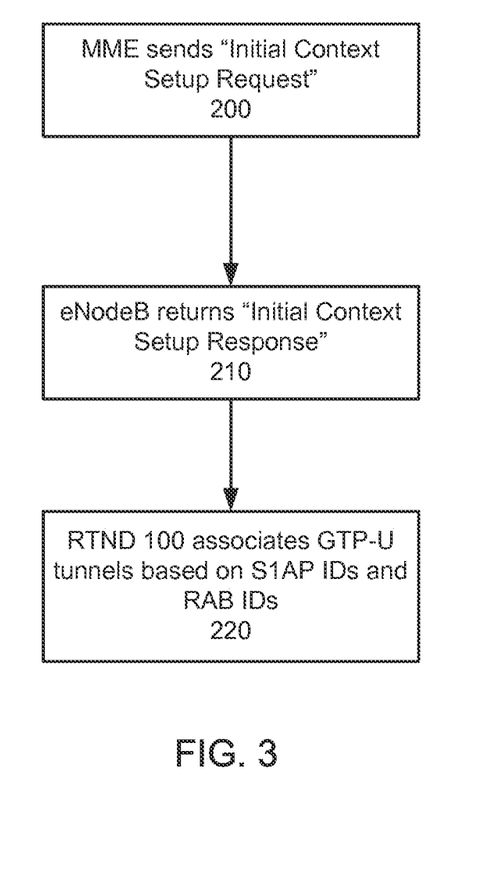
FIG. 3 shows a flowchart that can be used to associate two GTP-U tunnels.

Different methods may be used to learn the tunnel and user IP address associations in various configurations. For example, in one configuration, the Non Access Stratum Protocol Data Units (NAS PDUs) are encrypted in the LTE Architecture. The IP addresses assigned by the mobile network are contained within the encrypted portions of NAS PDUs, and therefore, the association of the unidirectional GTP-U tunnel IDs corresponding to the UE IP addresses can not be decoded. This method is illustrated in FIG. 3.

To establish a user plane GTP-U tunnel for data transfer, the MME sends "Initial Context Setup Request" message to the eNodeB, as shown in step 200. This message contains the following fields or parameters:
  i. MME-UE-S1AP-ID,
  ii. eNodeB-UE-S1AP-ID,
  iii. Transport Layer Address (TLA) & GTP-TEID (Tunnel Endpoint Identifier) for uplink traffic,
  iv. Other information elements, such as E-RAB ID, E-RAB QOS Parameters, and
  v. encrypted NAS PDU that contains bearer IP address However, since the NAS PDU is encrypted and the RTND 100 is not within the security context, the NAS PDU cannot be decoded by RTND 100. Thus, the RTND 100 cannot associate the bearer IP address to a tunnel based solely on this message.

In step 210, the eNodeB receives the "Initial Context Setup Request" from step 200, and returns "Initial Context Setup Response" message that contains:
  i. MME UE S1AP ID and eNodeB UE S1AP ID,
  ii. E-RAB ID,
  iii. TLA & GTP-TEID for sending downstream traffic of this UE to this eNodeB, and
  iv. other information elements.

The MME-UE-S1AP-ID, eNodeB-UE-S1AP-ID, and RAB-IDs in the above messages identify that they are for the same UE, and the same E-RAB. The TLA and GTP-TEIDs are unidirectional in the sense that one TLA and GTP-TEID pair corresponds to the tunnel for downstream traffic to the eNodeB for the specific UE, and the other {TLA,GTP-TEID} pair defines the tunnel that the eNodeB should use for sending upstream traffic from the UE.

Thus, the RTND 100 snoops the S1-AP messages and associates the "Initial Context Setup Request" message (step 200) and the "Initial Context Setup Response" message (step 210). Since the same per UE S1AP IDs, and RAB IDs are used, the RTND 100 can establish a relationship between the two unidirectional {TLA, GTP-TEID} pairs, as shown in step 220. However, as stated above, because the NAS Portion of the message that contains the bearer IP Address (UE IP Address) may be encrypted, the UE IP Address corresponding to these GTP tunnels is unknown to the RTND 100. Thus, the RTND 100 can associate the two tunnels based only on control plane information.

Figure 4:
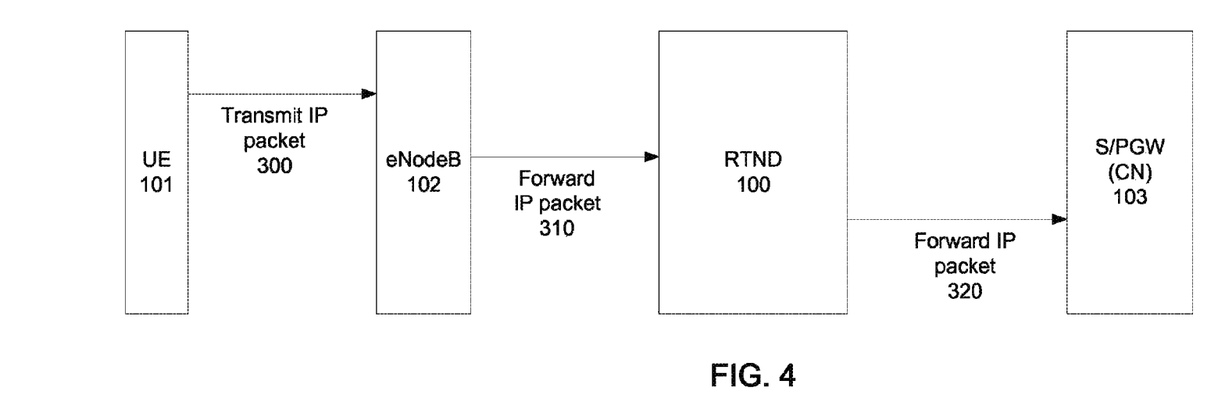
FIG. 4 shows the flow of an IP packet from an UE to the core network through the RTND.

FIG. 4 shows a sequence of communications within the LTE RAN. Each component of the RAN is represented, and communications between them are shown. As represented, communications are also shown such that those earlier in time are shown closer to the top of the diagram. First, as shown in step 300, to initiate a data access operation, such as accessing the internet, the UE 101 transmits an IP packet that contains the bearer IP address (UE IP Address), and the destination IP address (of a DNS server or remote web-server, application server etc.) to the eNodeB 102. The eNodeB 102 encapsulates the bearer IP packet into a GTP tunnel with the GTP-TEID and TLA identified in step 200.

In step 310, the eNodeB 102 transmits this packet to the RTND 100. The RTND 100 receives the GTP packet from step 310, in the user plane and forwards it to the S/PGW 103. This packet contains the TLA, GTP-TEID, IP Source Address (IP Address of UE), and Destination IP address. The RTND 100 associates the bearer IP address with the two unidirectional TLA & GTP-TEIDs learned from control plane (S1AP) steps 200 and 210 above. This bearer IP address is the IP address of the UE.

Figure 5:
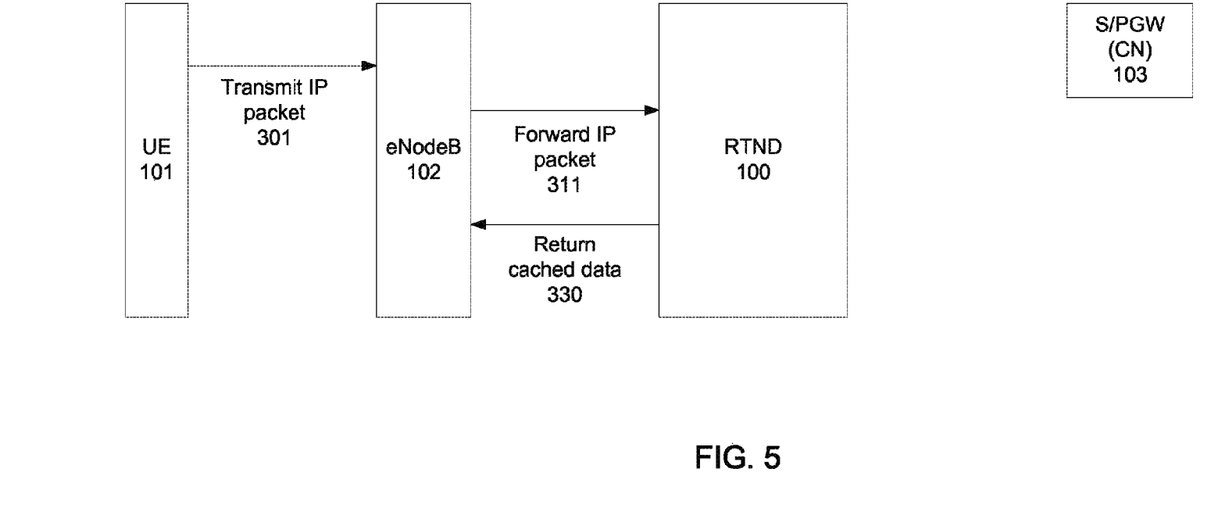
FIG. 5 shows the flow of an IP packet from an UE when cache data is available in the RTND.

Later, as shown in FIG. 5, IP packets 301 are sent from the UE 101 to the eNodeB 102. These IP packets are forwarded by the eNodeB 102 to the RTND 100, as shown in step 311. When IP packets with one or more bearer Source IP addresses are received from the eNodeB 102 with the TLA and GTP-TEID learned in Step 200, and the corresponding objects (for example, for http requests from the UE) are stored in local cache, the RTND 100 returns responses from local cache, as shown in step 330, by encapsulating the responses in the GTP tunnel with the TLA and GTP-TEID established in Steps 200, 210.

The operation described in FIGS. 4 and 5 may be compromised if the UE 101 is generating random source IP addresses, or doing IP spoofing, thus causing DOS (Denial of Service) attacks. To overcome this issue, the present invention identifies that in the upstream direction (i.e. eNodeB to Core Network traffic), the RTND 100 temporarily saves the Source and Destination Transport Layer Address, and the Destination TEID (tunnel id of SGW), Source and destination user plane IP addresses, and forwards the received GTP-U packets to the destination as specified by the TEID and TLA towards the Core Network (S/PGW) 103. The core network then validates the received packets, and, for valid bearer IP packets (where the TLA and TEID and embedded IP addresses are as assigned by the core network), returns Response Packets (for example DNS Response packets for DNS Requests, TCP-SYN-ACK packets for TCP-SYN packets etc.). The RTND 100 receives the GTP-U packets from the Core Network (CN) 103 with the TLA and TEID that corresponds to the eNodeB 102. These packets contain source TLA (SGW-TLA), Destination TLA (eNB TLA), destination TEID (eNodeB-TEID), User Plane destination IP address (UE IP address), User Plane source IP address (server IP address) that have been validated by the CN 103. After receiving this response message from the core network, the RTND 100 validates the information with the information previously saved from the earlier request message and marks the two unidirectional information as associated. Thus, once the two unidirectional GTP-U tunnels and Transport Layer Addresses are associated with each other and the corresponding UE IP address, the RTND 100 uses the UE-IP to TLA and TEID association information for any locally sourced traffic, such as for delivering cached content or for delivering content fetched through local offload interface. The RTND 100 associates this learned information with the uplink TLA and TEID learned in step 210 above. Subsequently, when bearer IP packets are received from the eNodeB 102 with TLA and TEID values that match the values from Step 210, the RTND 100 services them from local cache, only if the corresponding bearer source IP addresses are validated. If they are not validated, the RTND 100 forwards the packets towards the CN 103.

Figure 6:
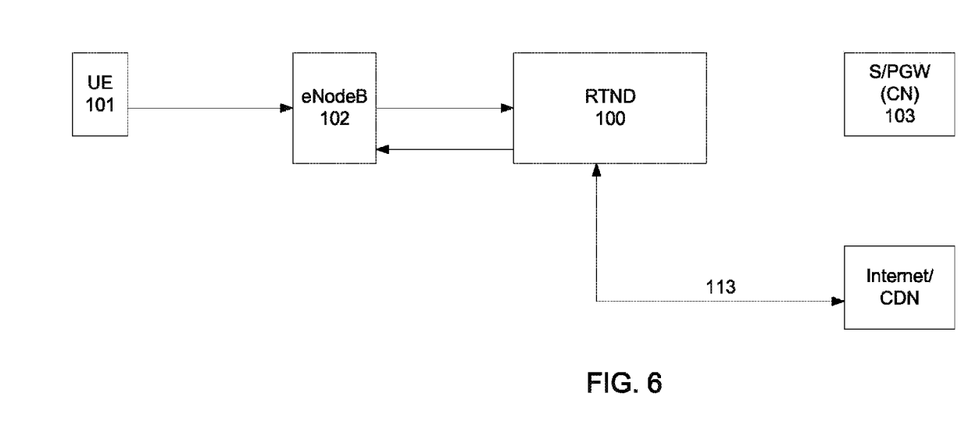
FIG. 6 shows the network topology for an offload interface.

An RTND may be deployed with offload interfaces (SIPTO) to the internet, to the operator data network, or to locally connected CDN device as identified in co-pending U.S. patent application Ser. No. 13/185,066, which is incorporated herein by reference in its entirety. One such embodiment is shown in FIG. 6. In this embodiment, the RTND 100 terminates the GTP-Tunnels for traffic received from eNodeB 102, and re-encapsulates the traffic received from offload interface 113 before sending to the eNodeB 102. The RTND 100 uses the GTP-TEID relationship established in steps 200, 210. The RTND 100 learns bearer IP addresses (UE IP Addresses) from GTP tunnel traffic received from the eNodeB 102 as described in FIGS. 4 and 5 above, or from GTP tunnel traffic received from the Core Network 103. The RTND 100 then establishes a correspondence between the bearer IP addresses and the associated uplink & downlink TLA and GTP-TEID. It marks these bearer IP addresses as valid, and performs SIPTO function for traffic received from these valid bearer IP address to overcome the DOS (Denial Of Service) and IP Spoofing attacks.

In some scenarios, the process shown in FIG. 3 may not have been performed, and therefore the RTND may not have the required associations. One example may be when a UE moves from the scope of one RTND 100 to another.

When a GTP packet is received by the RTND 100 with a TEID that has not yet been associated with a bearer IP address and/or with a TEID in reverse direction, the RTND 100 may construct a GTP packet with an ICMP packet as the payload, using the same transport layer addresses and CN/GTP-TEID as the received packet. The RTND 100 then transmits this GTP packet to the core network, typically directed to a well known server IP address on the internet. The ICMP Ping response packet received from the destination will have the GTP-TEID for the reverse dataflow for valid bearer IP addresses. This mechanism facilitates the association of the two unidirectional GTP tunnels and the bearer IP addresses corresponding to the unidirectional tunnels.

Figure 8:
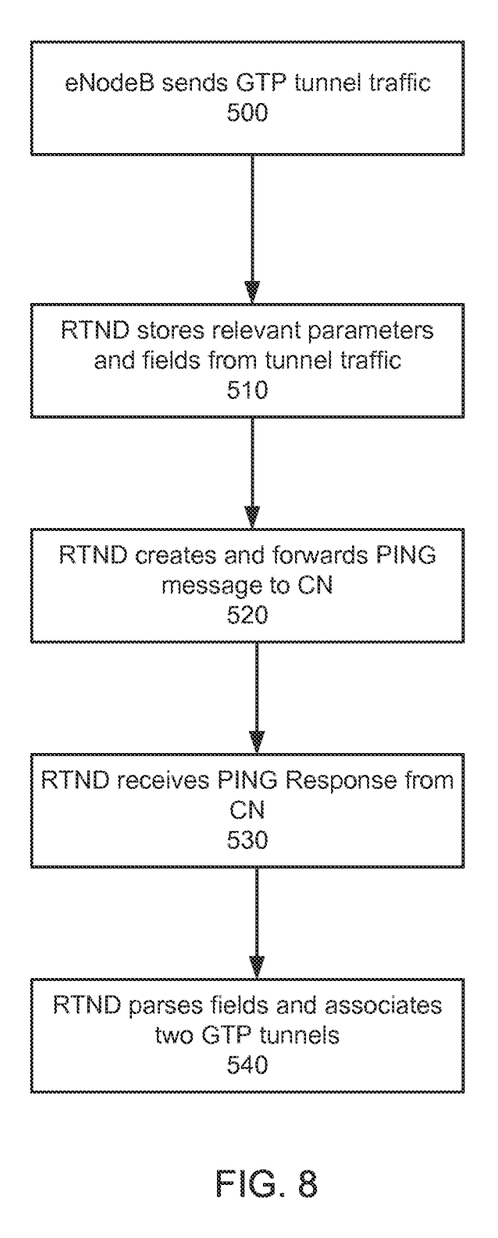
FIG. 8 shows a flowchart that can be used to associate two GTP-U tunnels according to another embodiment.

A flowchart of this method is shown in FIG. 8. As described above, the eNodeB 102 sends a GTP packet toward the CN 103, as shown in step 500. The RTND 100 receives this packet and stores relevant information, such as TLA and GTP-TEID for this tunnel, as shown in step 510. The RTND 100 then constructs a bearer ICMP ping packet, using this transport layer address and GTP-TEID and forwards that packet to the CN 103, as shown in step 520. The ICMP Ping response packet is returned from Core Network, as shown in step 530. This response will have the reverse tunnel information (GTP-TEID) for sending bearer packets to the specific UE to RNC/eNodeB 102. The RTND 100 can then associate the two tunnels.

This method can also be an alternative to the method shown in FIG. 3, such as if the received GTP packet is targeted to an offload interface.

In certain deployments, the IUPS control plane or S1-AP information may not be available to the RTND 100. In addition, in some mobility environments, the RTND 100 may see User Plane GTP Tunnel traffic (IUPS user plane, or S1-U) of a mobile device before a relationship is established between the two Unidirectional GTP TEIDs of a user and the associated one or more bearer IP Addresses (user IP addresses). The present disclosure identifies the methods to determine this information while delivering locally cached content and/or performing SIPTO Functions (selective forwarding of user request to offload interfaces where there is no per UE GTP tunnel through the offload interface).

The RTND 100 maintains a table of TLA/TEIDs learned from the RNC or eNodeB 102 IUPS User Plane/S1-U interface, and the associated bearer IP addresses. The TEIDs received from RNC/eNodeB 102 define the tunnels for sending traffic to the CN 103 but do not define the TEIDs for sending traffic to the RNC/eNodeB 102. If an associated tunnel does not exist, the RTND 100 forwards the GTP tunneled packets to the CN 103, or constructs an ICMP/Ping Packet with same destination tunnel (CN-TEID), and TLA as the received packet to a well known IP destination (for example to an operator configured DNS server).

When tunneled traffic is received from the core network (SGSN/GGSN/SGW) 103, the GTP tunneled traffic contains the TLA of destination RNC or eNodeB 102, the TEID for the specific user and bearer plane destination IP addresses that correspond to the User Device.

Figure 7:
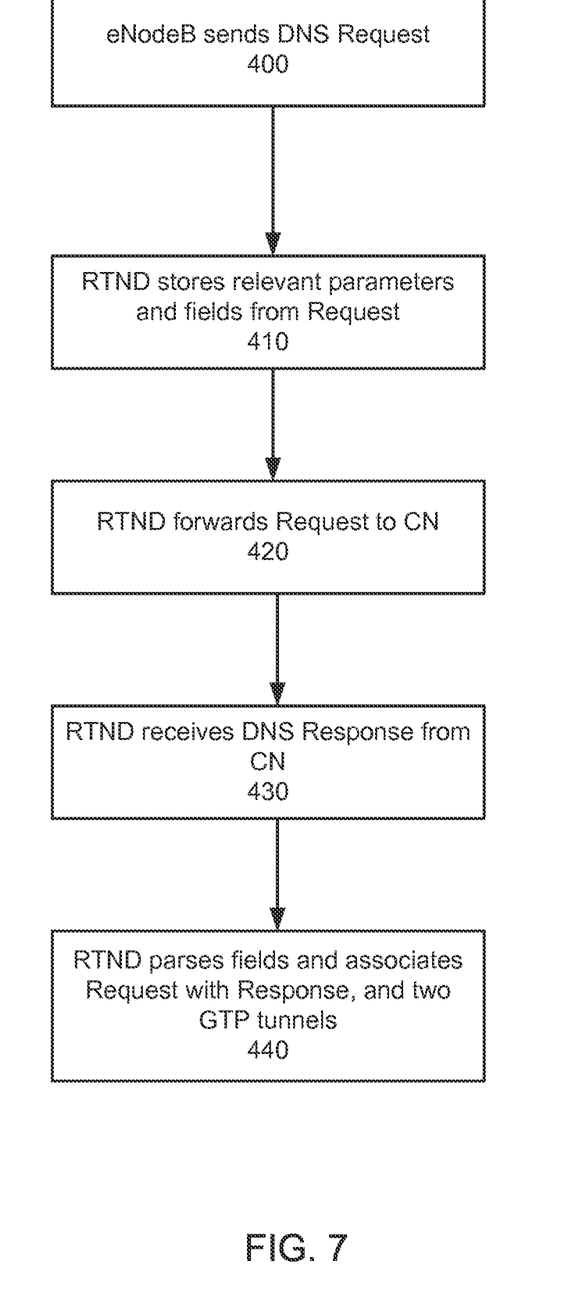
FIG. 7 shows a flowchart that can be used to associate two GTP-U tunnels according to another embodiment.

In addition to the method shown in FIG. 8, other methods can be used to associate the two tunnels. For example, most application protocols use the Request/Response paradigm. In this paradigm, the Requests and the associated Responses contain matching bearer plane IP addresses, Source/Destination UDP/TCP Ports, and protocol specific information elements. For example, as shown in FIG. 7, a DNS Request Packet is received from RNC/eNodeB 102, as shown in step 400. This packet contains Source and Destination TLAs, the GTP-TEID for sending traffic to the CN 103, the Source IP address that corresponds to User IP address, the DNS Server address, Source/Destination UDP Port Numbers, and DNS REQID. This information is stored by the RTND 100, as shown in step 410. This packet is then forwarded by the RTND 100 to the CN 103, as shown in step 420. The DNS Response is received from the CN 103, as shown in step 430. This DNS response contains the same fields as the DNS request, with Source and Destination fields interchanged, and the matching application fields, such as DNS REQID. Thus, the DNS Response could be associated with the corresponding DNS Request. The RTND 100 stores and uses the bearer plane IP address, Source/Destination Port Numbers and application information received from the CN 103 to associate the two Unidirectional GTP tunnels and the associated bearer IP addresses, as shown in step 440. This process may be done with other Request/Response messages, and is not limited to DNS messages.

When GTP tunneled packets are received from the eNodeB or RNC 102, the RTND 100 checks if the corresponding reverse tunnel is associated (as described in FIG. 7) before deciding whether the request could be satisfied locally from cache or using traffic offload functions (SIPTO functions). For any traffic received from RNC/eNodeB 102 where the reverse TEIDs are not associated, the RTND 100 forwards the traffic to the CN 103. However, if the reverse tunnels are associated, such as by using the method shown in FIG. 7, the RTND 100 performs proxy/cache and SIPTO functions based on the configured policies.

Learning user IP addresses from GTP tunneled traffic received from RNC/eNodeB 102 and serving content from local cache or SIPTO interfaces after the reverse tunnel is established, as described above, has the disadvantage that any spoofed bearer IP addresses or IP addresses not validated by the Core Network could overload the RAN, and could cause denial of service attacks for other users in RAN. To overcome this problem, RTND 100 may verify that any GTP tunneled packets received from RNC/eNodeB 102 contain bearer Source IP addresses that have already been validated with the GTP tunneled traffic from core network 103 before serving content from local cache or using SIPTO functions. This validation ensures that the bearer IP addresses within a GTP tunnel from RAN are validated by the core 103. If the validation fails, the RTND 100 bypasses local proxy/caching/SIPTO operations and forwards to the CN 103. Thus, for traffic with non-validated bear IP addresses, the behavior of the network with the RTND is the same as it would be without the RTND 100.

Another scenario arises when a UE moves from the scope of one RNC/eNodeB 102 to another RNC/eNodeB 102. Specifically, the new RNC/eNodeB 102 may have an associated in line RTND, and the previous RNC/eNodeB 102 may not have an associated RTND 100 or there may be no communication between the two RTND devices.

When the UE moves to the scope of a new RTND, that RTND 100 will not have any association between the two tunnels. Thus, when GTP tunneled traffic is received from RNC/eNodeB 102 or from CN 103, the associated TLAs, TEIDs, and bearer IP addresses are learned by the RTND 100 and the packets are forwarded between the two interfaces without performing any Proxy/Caching or traffic offload functions.

The RTND 100 can then learn these associations using the method shown in FIG. 3. When new tunnels are established in control plane (IUPS-CP or S1-AP), as described in FIG. 3, bearer IP addresses are associated from the user plane traffic with the unidirectional tunnel pair. Proxy/caching/SIPTO functions are then performed for subsequent tunneled traffic for those users.

As an alternative to this approach, the relationship between the two unidirectional tunnels and bearer IP addresses corresponding to a user may be established from user plane information only, as shown in FIG. 7. The Proxy/Caching/SIPTO operations that involve delivering cached content or using one or more offload interfaces are invoked after the TEID and bearer IP Address relationship has been established.

Mobility detection from the control plane and using such information in the user plane is the subject matter of a copending U.S. patent application Ser. No. 12/939,690, the disclosure of which is incorporated herein by reference in its entirety. The present disclosure defines methods of detecting mobility when the RTND 100 is deployed to intercept multiple IUPS or S1 interfaces using the User Plane information (IUPS-UP in UMTS or S1-U in LTE).

As described above, GTP tunneled traffic received from RNC or eNodeB contains:
  eNodeB Transport Layer Address (e-TLA),
  CN Transport Layer Address (CN-TLA),
  TEID to be used for sending traffic to CN for this UE (CN-TEID),
  UE-IP Address,
  Bearer SRC/DST TCP/UDP Port numbers and
  other application specific data.
Similarly, GTP tunneled traffic received from the CN 103 contains:
  CN-TLA,
  e-TLA,
  TEID to be used while sending user plane traffic for this UE at this eNodeB (e-TEID),
  UE-IP Address,
  Bearer SRC/DST TCP/UDP Port numbers and
  other application specific data.

When a UE moves from the scope of one eNodeB/RNC (referred to as the Source eNodeB/RNC) to the scope of a second eNodeB/RNC (referred to as the Target eNodeB/RNC), the two sets of eNodeBs/RNCs and MME/SGSN exchange control plane information for changing the e-TLA & e-TEID assigned by the source eNodeB/RNC to the new e-TLA and e-TEID that are associated with the Target eNodeB/RNC. After this operation is complete, the traffic from SGW/SGSN to that UE contains the e-TLA and e-TEID that corresponds to the target eNodeB/RNC. In other words, the GTP traffic from the SGW/SGSN appears the same as shown above, except with new e-TLA and e-TEID fields.

When the RTND is intercepting user plane traffic from both the Source eNodeB/RNC and the target eNodeB/RNC, it sees the new eTLA and eTEIDs for the same bearer plane IP address, the same bearer Src/Dst Port Numbers, and the same CN-TLA. In addition, the CN-TEID may also be the same, although this is Core Network implementation dependent. Thus, when eTLA, eTEID change for the same bearer plane IP address, the same CN-TLA, and optionally the same CN-TEID, the RTND 100 identifies that the UE moved from the scope of one eNodeB/RNC to the scope of another eNodeB/RNC. The detection of mobility from the scope of one eNodeB/RNC to another within the same RTND facilitates estimating the traffic load of both source and target eNodeB/RNCs, and facilitates downstream traffic delivery and scheduling optimizations in RTND.

The above described methods of detecting a UE's mobility from the scope of one eNodeB to another eNodeB also allows the RTND to establish both of the eNodeB's as neighbors to each other. Thus, when traffic from a number of eNodeBs passes through RTND, it may be able to establish adjacency/neighbor relationships between them as described above. Thus, the RTND may construct a topology map of the corresponding eNodeBs.

As an example, when a UE moves from a first eNodeB (eNB1) to a second eNodeB (eNB2), the transport addresses and tunnel-id that the S/PGW uses changes from eNB1's address to eNB2's address. Thus, in a network with many eNodeB's, the adjacency of eNB1 and eNB2 may be established. Similarly, if there is mobility of UEs from eNB1 to eNB2, eNB5, and eNB8, then it could be concluded eNB1 has neighbors eNB2, eNB5, and eNB8, and that eNB3, eNB4, eNB5, eNB6, and eNB7 are likely not its neighbors. Thus from this information, the UE's mobility patterns could be predicted for future traffic. If the eNodeBs' physical location (Geo-Coordinates) are known by manual configuration or communication with a operator network device, the RF topology layout of the various eNodeB's could be estimated from the learned mobility patterns of UEs. The RTND, while operating as content proxy, intercepts HTTP protocols. When devices support GPS, and propagate UE's geo-coordinates, the RTND may recognize these GEO coordinates, and associate the coordinates with corresponding eNodeBs, for example from a UE that is getting the maximum throughput.

In certain operator configurations in LTE or UMTS deployments, the bearer IP addresses of two mobile devices (UEs) may be same. For example, this may happen if the two UEs are associated with two different APNs. The APN information is exchanged through control plane protocols (S1-AP or IUPS-CP) with NAS PDUs. In the LTE configuration, NAS PDUs may be encrypted and the APN information within the control protocol may not visible to the transit network device, such as the RTND that is intercepting user plane and control plane protocols. In this scenario, the transport layer addresses (TLA) and/or GTP-TEIDs that carry the bearer IP traffic will be different for two different UEs with the same bearer IP address. The current invention uses TLAs and/or GTP-TEIDs to distinguish between the two user flows while serving from local cache or offload interface (SIPTO function).

In another embodiment, a single UE IP address may utilize multiple user plane tunnels. This scenario arises for flow based charging or if 2 applications on the UE require different Qualities of Service (QOS) from the network. In this case, the user plane TCP/UDP source or destination port numbers will be different for the two tunnels. For example, one GTP-U tunnel may be used for accessing internet traffic through TCP destination port number 80, and a different tunnel for accessing mail-server. In this scenario, the RTND 100 uses the bearer plane Source/Destination Port Numbers in addition to the bearer plane Source/Destination IP addresses for associating relationship between the unidirectional tunnels.

Figure 9:
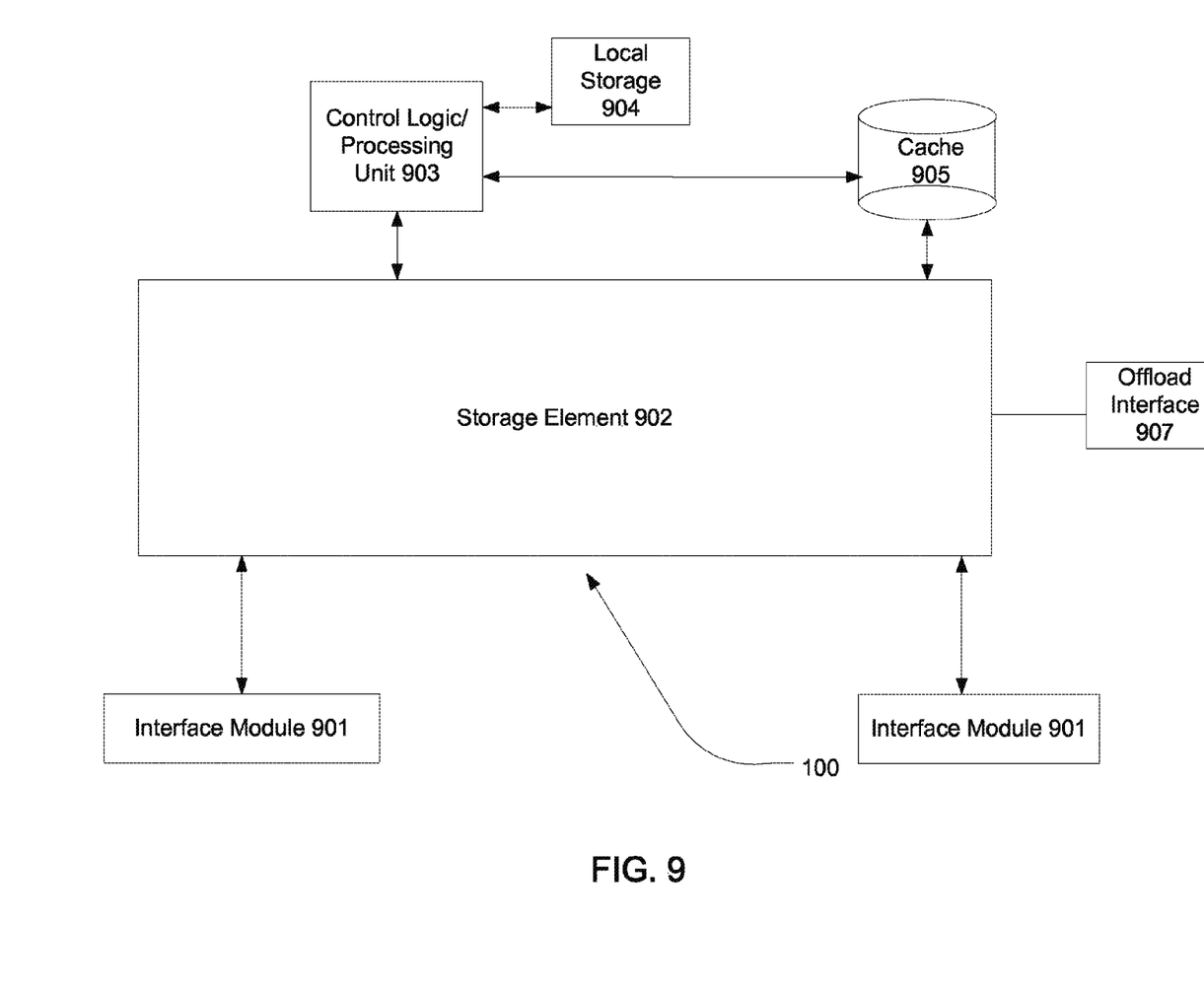
FIG. 9 shows one embodiment of a RTND of the present invention.

FIG. 9 shows a representative block diagram of the RTND. The RTND 100 has two interface modules 901, each of which is adapted to implement the hardware signaling required for the choice interface and the associated software protocol. This interface protocol may be IuB, IuPS or other protocols. Each interface module 901 is adapted to receive and transmit on the selected interface. Additionally, received data is placed into a storage element 902, typically a semiconductor storage element such as a RAM, DRAM or an equivalent technology. The movement of data from the interface module to the memory 902 and vice versa may be accomplished using dedicated hardware, such as a DMA controller. Alternatively, a dedicated data movement processor may be used to handle the actual movement of data through the RTND 100. Once stored within the RTND 100, the information is processed in accordance with the RAN specifications. This may be done using dedicated control logic or a processing unit 903. The control logic/processing unit 903 may have its own local storage element 904, which contains instructions to execute and local status. This storage element may be RAM or DRAM. In addition, at least a portion of this storage element 904 may be non-volatile, such as ROM, FLASH ROM, hard disk, Solid State Disk, or the like. Using known specifications and protocols, the control logic/processing unit 903 parses the received information to understand the packet at each protocol layer.

Also included may be a large storage element 905, adapted to hold cached information. In some embodiments, this cache storage may be semiconductor memory, such as RAM or DRAM. In other embodiments, this cache storage may be a rotating media, such as a disk drive or other large storage device.

Also included may be an offload interface 907 which may be used for SIPTO or TOF functions.

The control logic/processing unit 903 may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

The RTND 100 also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method of associating two unidirectional tunnels corresponding to a wireless device, using a transit network device placed in a wireless mobile network to intercept traffic, where said traffic is carried in encapsulated unidirectional tunnels, said method comprising:
  using said transit network device to monitor upstream traffic to a mobile core network and downstream traffic from said mobile core network;
  identifying upstream messages in said upstream traffic which are from said mobile device;
  identifying downstream messages in said downstream traffic which are destined for said mobile device; and
  associating transport layer information and tunnel identity information in said identified upstream message with transport layer information and tunnel identity information in said identified downstream message, thereby associating two unidirectional tunnels.

2. The method of claim 1, wherein said mobile network utilizes a protocol selected from the group comprising UMTS, EVDO/CDMA, LTE and WIMAX.

3. A method of providing cached data and overcoming DOS and spoofing attacks occurring in a wireless mobile network, comprising:
  associating a transport layer address (TLA) and tunnel endpoint identifier (TEID) for upstream messages from a user device with a TLA and TEID for downstream messages;
  storing said TLA and TEID association in a storage element;
  identifying a message from said user device;
  comparing a TLA in said message with said stored TLA and TEID information; and
  determining whether to transmitted said cached data to said user device based on said comparison.

4. The method of claim 3, further comprising detecting a DOS or spoofing attack if said comparison fails.

5. The method of claim 3, further comprises detecting a DOS or spoofing attack, wherein said detecting comprising:
  validating IP addresses received in said upstream messages with destination IP addresses contained in said downstream messages of the said associated tunnels.

6. The method of claim 3, further comprising forwarding said upstream message to a core network if a downstream message has not been associated with an upstream message.

7. The method of claim 3, further comprising limiting the number and rate of upstream messages if a downstream message has not been associated with an upstream message.

8. A method of associating two unidirectional tunnels corresponding to a wireless device, using a transit network device placed in a wireless mobile network to intercept traffic, where said traffic is carried in encapsulated unidirectional tunnels, in which NAS payloads are encrypted, said method comprising:
  using said transit network device to monitor upstream traffic to a mobile core network and downstream traffic from said mobile core network;
  identifying an upstream message in said upstream traffic which is from said mobile device;
  identifying a downstream message in said downstream traffic which is in response to said upstream message, destined for said mobile device;
  associating a transport layer address (TLA) and tunnel endpoint identifier (TEID) in said identified upstream message with a TLA and TEID in said identified downstream message, thereby associating two unidirectional tunnels; and
  receiving a subsequent message from said mobile device containing said TLA, said TEID, and a bearer IP address, thereby associating an IP address for said mobile device with said two unidirectional tunnels.

9. A method of identifying mobility of a mobile device in a wireless mobile network, comprising:
  using said transit network device to monitor upstream traffic to a mobile core network and downstream traffic from said mobile core network;
  associating a transport layer address (TLA) and tunnel endpoint identifier (TEID) in an identified upstream message with a TLA and TEID in an identified downstream message, thereby associating two unidirectional tunnels associated with said mobile device;
  associating a IP address for said mobile device with said two unidirectional tunnels;
  detecting two sets of network devices exchanging control plane information, said exchanging indicative of movement of said mobile device from a source eNodeB to a target eNodeB; and
  determining a new TLA and TEID to be used by said mobile device for upstream messages transmitted through said target eNodeB.

10. The method of claim 9, further comprising estimating traffic load of said source and target eNodeBs based on said movement of said mobile device.

11. The method of claim 9, further comprising constructing a network topology based on said movement of said mobile device.

* * * * *